US007805640B1

(12) United States Patent
Newstadt et al.

(10) Patent No.: US 7,805,640 B1
(45) Date of Patent: Sep. 28, 2010

(54) USE OF SUBMISSION DATA IN HARDWARE AGNOSTIC ANALYSIS OF EXPECTED APPLICATION PERFORMANCE

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 375 days.

(21) Appl. No.: 12/045,393

(22) Filed: Mar. 10, 2008

(51) Int. Cl.
*G06F 11/00* (2006.01)
(52) U.S. Cl. .......................................... 714/51; 714/38
(58) Field of Classification Search .................. 714/38, 714/51
See application file for complete search history.

(56) References Cited

U.S. PATENT DOCUMENTS

| | | | |
|---|---|---|---|
| 6,728,957 B1 * | 4/2004 | Nakazato | 718/100 |
| 7,237,023 B2 * | 6/2007 | Menard et al. | 709/224 |
| 2003/0033586 A1 * | 2/2003 | Lawler | 717/101 |
| 2003/0061546 A1 * | 3/2003 | Collins et al. | 714/42 |
| 2003/0117971 A1 * | 6/2003 | Aubury | 370/321 |
| 2003/0121010 A1 * | 6/2003 | Aubury | 716/4 |
| 2004/0003319 A1 * | 1/2004 | Ukai et al. | 714/25 |
| 2008/0126881 A1 * | 5/2008 | Bruckhaus | 714/47 |
| 2008/0244319 A1 * | 10/2008 | Nehab et al. | 714/38 |

* cited by examiner

*Primary Examiner*—Bryce P Bonzo
(74) *Attorney, Agent, or Firm*—Brill Law Office; Jeffrey Brill

(57) ABSTRACT

Hardware independent performance metrics for application tasks are assembled and submitted to a central repository from multiple installations in the field. These metrics are requested by and provided to specific computing devices, and used to calculate expected performance times for given application tasks on specific hardware configurations. Computing devices can automatically identify performance problems by comparing actual performance times of application tasks to calculated expected performance times. Events that take longer than expected to execute indicate a computing device performance issue.

20 Claims, 2 Drawing Sheets

USE OF SUBMISSION DATA IN HARDWARE AGNOSTIC ANALYSIS OF EXPECTED APPLICATION PERFORMANCE

TECHNICAL FIELD

This invention pertains generally to determining computing performance, and more specifically to using submitted data to determine a hardware independent performance estimate for any application program.

BACKGROUND

There is a lot of discussion today in the computer industry concerning improving the performance of personal computers. However, it can be difficult to automatically identify poor performance on a particular computing device, given the wide range of hardware and software configurations in the field. Solutions to this problem require detailed performance metrics about the thousands (and constantly growing number) of applications currently in use. It is a difficult, manual process to collect these metrics, and to keep them continuously up-to-date.

It would be desirable to simplify this process.

SUMMARY

Hardware independent performance metrics for application tasks are assembled and submitted to a central repository from multiple installations in the field. These metrics are requested by and provided to specific computing devices, and used to calculate expected performance times for given application tasks on specific hardware configurations. Computing devices can automatically identify performance problems by comparing actual performance times of application tasks to calculated expected performance times. Events that take longer than expected to execute indicate a computing device performance issue.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
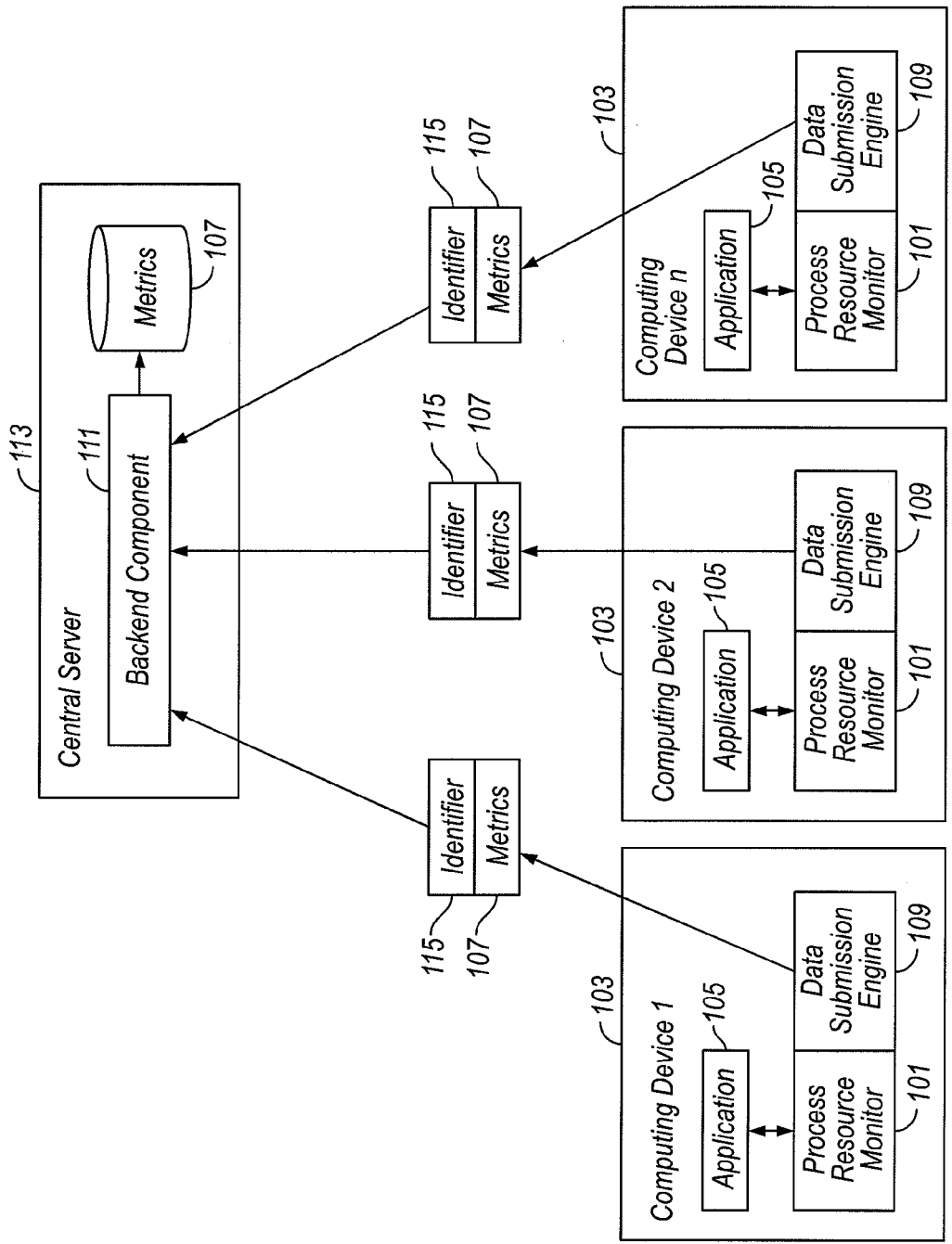
FIG. 1 is a block diagram illustrating a system for using submitted data to determine hardware independent performance estimates for application programs, according some embodiments of the present invention.

FIG. 1 illustrates using submitted data to determine hardware independent performance estimates for application programs, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a process resource monitor 101 deployed on at least one computing device 103 monitors performance of running applications and processes 105, and quantifies the measured performance in hardware independent metrics 107. As explained in more detail below in conjunction with FIG. 2, a process resource monitor 101 can also monitor the time it takes for specific application tasks to execute. It is to be understood that although FIG. 1 illustrates three computing devices 103 running process resource monitors 101, application performance monitoring as described herein can be executed on any practicable number of computing devices 103, from one to a very large number as desired. The hardware independent metrics 107 compiled by the process resource monitor 101 include such data as number of executed instructions, number of disk accesses, memory size, network bandwidth usage, and other metrics 107 that are independent of the speed, memory and disk sizes and other characteristics of the specific hardware on which the process 105 is executed. It is to be understood that such metrics 107 can be compiled per different application events 105, such as startup, close, etc. Metrics 107 can also be gathered at a higher level (per application 105 generally) or a lower level (per a very specific application task 105 such as, e.g., loading a specific device driver or sorting a list.)

The implementation mechanics of monitoring application tasks 105 and gleaning such performance metrics 107 is within the skill set of those of ordinary skill in the relevant art, and the usage thereof within the context of the present invention will be readily apparent to one of such a skill level in light of this specification.

As illustrated in FIG. 1, a data submission engine 109 transmits gleaned resource usage metrics 107 for various applications 105 to a backend component 111, running on a central repository, for example, a central server computer 113 as illustrated. The metrics 107 submitted to the backend component 111 are accompanied by an identifier 115 of the corresponding application 105 that generated them, for example a hash of the application binary or the like.

The backend component 111 receives and stores data submission engine 109 submitted resource usage metrics 107 for various applications 105. Because the backend component 111 is potentially receiving metrics 107 from a wide distribution of computing devices 103 and from many executions of given applications events 105, in some cases submitted metrics 107 may vary somewhat, even though they are intended to be hardware independent. For this reason, the backend component 111 can compute averages (or any type of statistical normalization) of such metrics 107. In any case, resource usage metrics 107 are stored such that they are associated with the generating application or process 105, for example with the use of the application identifier 115. The metrics 107 are kept in hardware independent units, such as number of instructions rather than seconds or percent load.

Figure 2:
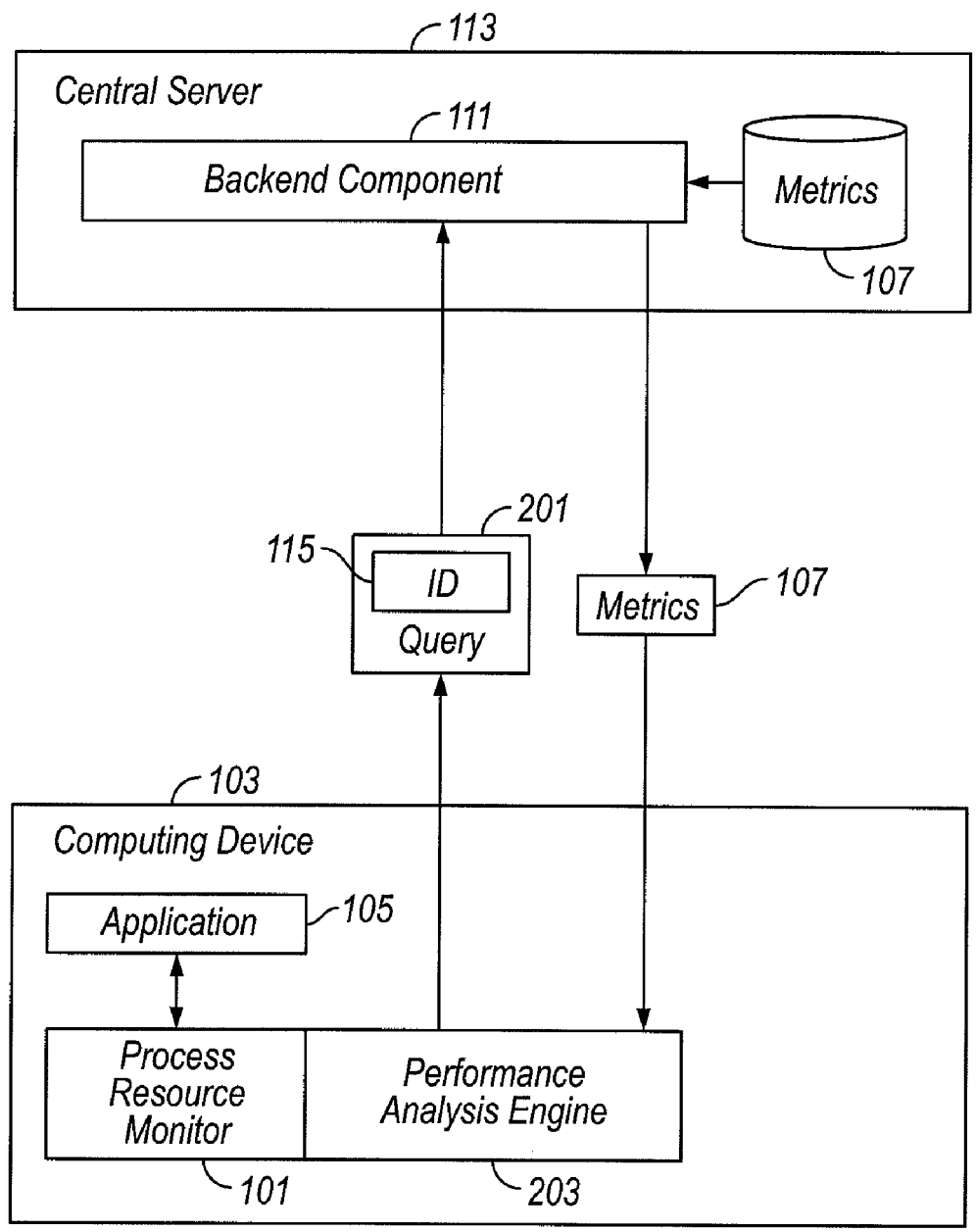
FIG. 2 is a block diagram illustrating a system for determining whether a computing device is performing properly, according to some embodiments of the present invention.

As illustrated in FIG. 2, a computing device 103 in the field can query 201 the backend component 111 for metrics 107 associated with a particular application 105, providing the application's identifier 115 in the query 201. The backend component 111 submits the requested metrics 107 to the device 103, which can then calculate the expected performance of the application 105 on its particular hardware configuration. As the application 105 runs, its performance is monitored to determine how it compares to expectations. If the application 105 is performing more poorly than expected, then it can be concluded that the computing device has a performance problem.

More specifically, the process resource monitor 101 on the computing device 103 monitors process resource usage during application events 105. It measures the amount of time a given event takes to execute, and feeds this information to a device specific performance analysis engine 203. As explained in more detail above in conjunction with FIG. 1, the process resource monitor 101 can also measure hardware independent performance metrics 107 for the performance of the application 105, and submit these metrics 107 to the backend component 111 via the data submission engine 109.

As illustrated, a device specific performance analysis engine 203 runs on the computing device 103, and identifies the hardware components installed on the computing device 103, and their expected performance ratings (e.g., speed of the processer, access time of the memory, etc.). The performance analysis engine 203 can perform this hardware component identification, for example, at load time. The hardware identified can include CPU, disk drive, memory, bus, network connection, etc. The implementation mechanics of identifying installed hardware components and their associated performance ratings is within the skill set of those of ordinary skill in the relevant art, and the usage thereof within the context of the present invention will be readily apparent to one of such a skill level in light of this specification.

As an application 105 of interest executes on the device 103, the performance analysis engine 203 receives information from the process resource monitor 101 concerning the length of time specific application events 105 take to execute. The performance analysis engine 203 queries the backend component 111 and receives device independent metrics 107 for the application events 105 of interest. The performance analysis engine 203 calculates the amount of time an application event 105 should take, given the expected resource usage for the event and the capability of the hardware. The performance analysis engine 203 compares expected execution times to actual execution times, and determines whether given application events 105 are executing within expected timeframes, or whether the events 105 are taking undue amounts of time to complete. From this data, it can be concluded whether the computing device 113 is or is not performing properly.

As will be understood by those familiar with the art, the invention may be embodied in other specific forms without departing from the spirit or essential characteristics thereof. Likewise, the particular naming and division of the portions, modules, agents, managers, monitors, engines, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, monitors, engines, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software means and portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for determining whether a computing device is performing properly, the method comprising the steps of:
   receiving hardware independent metrics quantifying performance of at least one application event;
   monitoring an execution time of the at least one application event on the computing device;
   utilizing the hardware independent metrics quantifying the performance of the at least one application event to determine an expected execution time for the at least one application event on the computing device;
   comparing the monitored execution time to the expected execution time; and
   responsive to results of the comparing step, determining whether the computing device is performing properly.

2. The method of claim 1 wherein receiving hardware independent metrics quantifying performance of at least one application event further comprises:
   receiving hardware independent metrics compiled from monitoring at least one execution of the at least one application event on at least one other computing device.

3. The method of claim 1 wherein utilizing the hardware independent metrics quantifying the performance of the at least one application event to determine an expected execution time for the at least application event on the computing device further comprises:
   identifying hardware components of the computing device; and
   calculating an expected execution time for the at least one application event on the computing device based on the hardware independent metrics for the at least one application event and the identified hardware components of the computing device.

4. The method of claim 1 wherein determining whether the computing device is performing properly further comprises performing a step from a group of steps consisting of:
   responsive to the monitored execution time being sufficiently greater than the expected execution time, determining that the computing device is not performing properly; and
   responsive to the monitored execution time not being sufficiently greater than the expected execution time, determining that the computing device is performing properly.

5. The method of claim 1 further comprising:
  monitoring execution of the at least one application event on the computing device;
  quantifying performance of the at least one application event in hardware independent metrics; and
  submitting the hardware independent metrics to a central repository.

6. The method of claim 1 further comprising:
  transmitting at least one request for hardware independent metrics quantifying performance of at least one application event to a central repository.

7. A computer implemented method for compiling comprehensive hardware independent metrics quantifying performance of applications, the method comprising the steps of:
  receiving hardware independent metrics quantifying a plurality of executions of a plurality of events of a plurality of applications from a plurality of computing devices;
  assembling composite hardware independent metrics for each of the plurality of events of each of the plurality of applications;
  receiving at least one request from at least one computing device for hardware independent metrics quantifying performance of at least one application event; and
  responsive to the at least one received request, transmitting composite hardware independent metrics for the at least one application event to the at least one computing device.

8. At least one computer readable medium containing a computer program product for determining whether a computing device is performing properly, the computer program product comprising:
  program code for receiving hardware independent metrics quantifying performance of at least one application event;
  program code for monitoring an execution time of the at least one application event on the computing device;
  program code for utilizing the hardware independent metrics quantifying the performance of the at least one application event to determine an expected execution time for the at least one application event on the computing device;
  program code for comparing the monitored execution time to the expected execution time; and
  program code for, responsive to results of the comparing step, determining whether the computing device is performing properly.

9. The computer program product of claim 8 wherein the program code for receiving hardware independent metrics quantifying performance of at least one application event further comprises:
  program code for receiving hardware independent metrics compiled from monitoring at least one execution of the at least one application event on at least one other computing device.

10. The computer program product of claim 8 wherein the program code for utilizing the hardware independent metrics quantifying the performance of the at least one application event to determine an expected execution time for the at least application event on the computing device further comprises:
  program code for identifying hardware components of the computing device; and
  program code for calculating an expected execution time for the at least one application event on the computing device based on the hardware independent metrics for the at least one application event and the identified hardware components of the computing device.

11. The computer program product of claim 8 wherein the program code for determining whether the computing device is performing properly further comprises program code for performing a step from a group of steps consisting of:
  responsive to the monitored execution time being sufficiently greater than the expected execution time, determining that the computing device is not performing properly; and
  responsive to the monitored execution time not being sufficiently greater than the expected execution time, determining that the computing device is performing properly.

12. The computer program product of claim 8 further comprising:
  program code for monitoring execution of the at least one application event on the computing device;
  program code for quantifying performance of the at least one application event in hardware independent metrics; and
  program code for submitting the hardware independent metrics to a central repository.

13. The computer program product of claim 8 further comprising:
  program code for transmitting at least one request for hardware independent metrics quantifying performance of at least one application event to a central repository.

14. The computer program product of claim 8 further comprising:
  program code for receiving hardware independent metrics quantifying a plurality of executions of a plurality of events of a plurality of applications from a plurality of computing devices;
  program code for assembling composite hardware independent metrics for each of the plurality of events of each of the plurality of applications;
  program code for receiving at least one request from at least one computing device for hardware independent metrics quantifying performance of at least one application event; and
  program code for, responsive to the at least one received request, transmitting composite hardware independent metrics for the at least one application event to the at least one computing device.

15. A computer system for determining whether a computing device is performing properly, the computer system comprising:
  means for receiving hardware independent metrics quantifying performance of at least one application event;
  means for monitoring an execution time of the at least one application event on the computing device;
  means for utilizing the hardware independent metrics quantifying the performance of the at least one application event to determine an expected execution time for the at least one application event on the computing device;
  means for comparing the monitored execution time to the expected execution time; and
  means for, responsive to results of the comparing step, determining whether the computing device is performing properly.

16. The computer system of claim 15 wherein the means for receiving hardware independent metrics quantifying performance of at least one application event further comprise:
  means for receiving hardware independent metrics compiled from monitoring at least one execution of the at least one application event on at least one other computing device.

17. The computer system of claim 15 wherein the means for utilizing the hardware independent metrics quantifying the performance of the at least one application event to determine an expected execution time for the at least application event on the computing device further comprise:

means for identifying hardware components of the computing device; and means for calculating an expected execution time for the at least one application event on the computing device based on the hardware independent metrics for the at least one application event and the identified hardware components of the computing device.

18. The computer system of claim 15 wherein the means for determining whether the computing device is performing properly further comprise means for performing a step from a group of steps consisting of:

responsive to the monitored execution time being sufficiently greater than the expected execution time, determining that the computing device is not performing properly; and responsive to the monitored execution time not being sufficiently greater than the expected execution time, determining that the computing device is performing properly.

19. The computer system of claim 15 further comprising:

means for monitoring execution of the at least one application event on the computing device;

means for quantifying performance of the at least one application event in hardware independent metrics; and means for submitting the hardware independent metrics to a central repository.

20. The computer system of claim 15 further comprising:

means for receiving hardware independent metrics quantifying a plurality of executions of a plurality of events of a plurality of applications from a plurality of computing devices;

means for assembling composite hardware independent metrics for each of the plurality of events of each of the plurality of applications;

means for receiving at least one request from at least one computing device for hardware independent metrics quantifying performance of at least one application event; and means for, responsive to the at least one received request, transmitting composite hardware independent metrics for the at least one application event to the at least one computing device.

* * * * *